US012620045B2

(12) United States Patent
Irwin et al.

(10) Patent No.: US 12,620,045 B2
(45) Date of Patent: May 5, 2026

(54) SYSTEM AND METHOD OF IDENTITY VERIFICATION

(71) Applicant: United States Postal Service, Washington, DC (US)

(72) Inventors: Donald E. Irwin, Fredericksburg, VA (US); Nan K. McKenzie, Garrett Park, MD (US); William A. Tartal, Baltimore, MD (US); Victoria K. Stephen, Burke, VA (US); Michael J. Amato, Reston, VA (US); William G. Ackerman, Washington, DC (US); Robert E. Dixon, Washington, DC (US); Daniel W. Smith, Washington, DC (US); Gregory Crabb, Broadlands, VA (US); Paul Anthony Bernicchi, Land O Lakes, FL (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 18/057,438

(22) Filed: Nov. 21, 2022

(65) Prior Publication Data

US 2023/0091390 A1 Mar. 23, 2023

Related U.S. Application Data

(63) Continuation of application No. 17/239,386, filed on Apr. 23, 2021, now Pat. No. 11,508,024, which is a (Continued)

(51) Int. Cl.
G06V 30/418 (2022.01)
G06Q 20/40 (2012.01)
(Continued)

(52) U.S. Cl.
CPC ....... *G06Q 50/265* (2013.01); *G06Q 20/4014* (2013.01); *G06Q 20/405* (2013.01); *G06Q 30/0185* (2013.01); *G06V 30/418* (2022.01)

(58) Field of Classification Search
CPC ............. G06Q 50/265; G06Q 20/4014; G06Q 20/405; G06Q 30/0185; G06V 30/418
(Continued)

(56) References Cited

U.S. PATENT DOCUMENTS 7,483,862 B1 1/2009 Robinson et al.
7,606,918 B2 10/2009 Holzman et al.
(Continued)

FOREIGN PATENT DOCUMENTS

CN 1139894 C 2/2004
CN 101697514 A 4/2010
(Continued)

*Primary Examiner* — Clifford B Madamba
(74) *Attorney, Agent, or Firm* — Knobbe, Martens, Olson & Bear, LLP

(57) ABSTRACT

A system and method of verifying the identity of a user or registrant. The user or registrant provides identification information and registration information. The identification information may be a visual representation of an identifying item associated with location information. In some embodiments, the identification information may be a visual representation of a government issued identity. An identification module verifies the identification information and compares the verified identification information to the registration information.

20 Claims, 3 Drawing Sheets

Related U.S. Application Data continuation of application No. 14/967,083, filed on Dec. 11, 2015, now Pat. No. 10,991,061, which is a continuation of application No. 14/208,421, filed on Mar. 13, 2014, now Pat. No. 9,311,646.

(60) Provisional application No. 61/792,749, filed on Mar. 15, 2013.

(51) Int. Cl.
　　 *G06Q 30/018*　　　 (2023.01)
　　 *G06Q 50/26*　　　　 (2012.01)

(58) Field of Classification Search
　　 USPC .......................................................... 705/44
　　 See application file for complete search history.

(56) References Cited

U.S. PATENT DOCUMENTS

| | | | |
|---|---|---|---|
| 8,144,055 B2 | 3/2012 | Tysowski et al. | |
| 8,150,616 B2 | 4/2012 | Shimizu | |
| 8,341,712 B2 | 12/2012 | Machani | |
| 8,500,012 B2 * | 8/2013 | Amdahl | G07F 17/12 |
| | | | 235/382 |
| 9,015,207 B2 | 4/2015 | Foit | |
| 9,047,617 B2 | 6/2015 | Sanchez et al. | |
| 9,077,716 B2 * | 7/2015 | Myers | H04L 63/10 |
| 9,135,425 B2 * | 9/2015 | Yau | H04W 12/06 |
| 9,280,684 B1 | 3/2016 | Kragh et al. | |
| 9,716,711 B2 * | 7/2017 | Porter | G06F 21/645 |
| 2002/0029248 A1 | 3/2002 | Cook et al. | |
| 2003/0004743 A1 | 1/2003 | Callegari | |
| 2003/0022676 A1 | 1/2003 | Nakamoto et al. | |
| 2004/0211838 A1 | 10/2004 | O'Callaghan et al. | |
| 2009/0254440 A1 | 10/2009 | Pharris | |
| 2009/0257569 A1 | 10/2009 | Bristow et al. | |
| 2009/0305667 A1 * | 12/2009 | Schultz | H04M 3/382 |
| | | | 455/410 |
| 2010/0024017 A1 | 1/2010 | Ashfield et al. | |
| 2011/0053559 A1 | 3/2011 | Klein | |
| 2011/0066550 A1 | 3/2011 | Shank et al. | |
| 2012/0089618 A1 | 4/2012 | Anschutz et al. | |
| 2012/0281077 A1 | 11/2012 | Cañero Morales et al. | |
| 2012/0291107 A1 | 11/2012 | Piliouras | |
| 2012/0293642 A1 | 11/2012 | Berini et al. | |
| 2013/0022231 A1 | 1/2013 | Nepomniachtchi et al. | |
| 2013/0027227 A1 | 1/2013 | Nordstrom | |
| 2013/0028502 A1 | 1/2013 | Nepomniachtchi et al. | |
| 2013/0117862 A1 | 5/2013 | Farrell et al. | |
| 2014/0074733 A1 | 3/2014 | Den Herder et al. | |
| 2014/0089672 A1 * | 3/2014 | Luna | H04L 9/3231 |
| | | | 713/186 |
| 2014/0258136 A1 | 9/2014 | Ellis | |
| 2014/0279450 A1 | 9/2014 | Gujral | |
| 2014/0279519 A1 | 9/2014 | Mattes et al. | |
| 2015/0002915 A1 * | 1/2015 | Lebaschi | H04N 1/484 |
| | | | 358/538 |
| 2015/0032625 A1 | 1/2015 | Dill et al. | |
| 2015/0120529 A1 | 4/2015 | Faaborg | |
| 2015/0120536 A1 | 4/2015 | Talker | |
| 2015/0127535 A1 | 5/2015 | Chavarria et al. | |
| 2015/0199643 A1 | 7/2015 | Hubner et al. | |
| 2015/0248439 A1 | 9/2015 | Ratnakar | |
| 2016/0300242 A1 | 10/2016 | Truong et al. | |
| 2017/0169422 A1 | 6/2017 | Ye et al. | |

FOREIGN PATENT DOCUMENTS

| | | |
|---|---|---|
| CN | 102045367 A | 5/2011 |
| CN | 102339441 A | 2/2012 |

\* cited by examiner

SYSTEM AND METHOD OF IDENTITY VERIFICATION

INCORPORATION BY REFERENCE OF PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 17/239,386, filed Apr. 23, 2021, which is a continuation of U.S. application Ser. No. 14/967,083, filed Dec. 11, 2015, now U.S. Pat. No. 10,991, 061, which is a continuation of U.S. application Ser. No. 14/208,421, filed Mar. 13, 2014, now U.S. Pat. No. 9,311, 646, which claims the benefit of priority to U.S. Application No. 61/792,749, filed Mar. 15, 2013, the entire contents of which are hereby incorporated by reference.

BACKGROUND OF THE INVENTION

Field

This disclosure relates to identity verification and mobile applications. Specifically, the disclosure relates to verifying an individual's identity using electronic means.

Background

Institutions are increasingly providing access for a user to conduct transactions and exchange information using an application available on a mobile electronic device or a home computer. Frequently, the transactions or information is confidential, and may be subject to institutional or legal requirements, such as opening an account or signing up with or to provide or receive services from an entity. Customers like the convenience and access offered by mobile applications and, the institutions like the simplified transactions and/or increased revenues. Transactions conducted online or via mobile applications often require a new customer to apply for enrollment which may include applying for an account. To apply for the enrollment, an applicant typically must provide positive proof of identity. Providing proof of identity online or via a mobile application is made more difficult by growing concern regarding fraud. Identity thieves can steal or otherwise gain access to personal information of a victim and use the information to fraudulently obtain an enrollment in a membership, a merchant or a commercial account, under a victim's name. Additionally, some information and transactions are regulated by state and/or federal law such as, for example, information and transactions involving the U.S. Mail, or other entities.

Accordingly, a system for verifying identity online or through a mobile application is desirable.

SUMMARY

In one aspect described herein a system for verifying identity comprises a server configured to receive registration information and identification information from a registrant; an identification module in communication with the server, wherein the identification module is configured to receive the registration information and the identification information, and wherein the identification module is configured to verify the identification information, and to compare the verified identification information to the registration information; and wherein the server is configured to verify the identity of the registrant based on the comparison of the verified identification information to the registration information.

In some embodiments, the identification information comprises a visual indication of a government issued identification.

In some embodiments, the identification information comprises a visual representation of an identifying item.

In some embodiments, the visual representation of the identifying item is associated with location information.

In some embodiments, the identification module is configured to verify the visual representation of the identifying item by comparing location information in the identification module with the location information associated with the visual representation of the identifying item.

In some embodiments, the identification module comprises more than one identification module.

In some embodiments, wherein the identification module is in communication with a third party verification database or government agency verification database.

In some embodiments, the identification module comprises a plurality of identification modules, and wherein another of the plurality of identification modules is in communication with a location verification database.

In another aspect, a system for verifying identity comprises a server configured to receive registration information from a registrant; an identity proofing system in communication with the server, wherein the identity proofing system is configured to receive a first portion of the identification information from the server and provide a first verification of the first portion of the registration information to the server; an identity database in communication with the server, wherein the identity database is configured to receive a second portion of the identification information from the server and provide a second verification of the second portion of the registration information to the server; and wherein the server is further configured to receive the first verification of the first portion of the identification information from the identity proofing system, and the second verification of the second portion of the identification information from the identity database, and to verify the identity of the registrant based on the first and second verifications.

In some embodiments, the registration and identification information is provided for registration of an account.

In some embodiments, the server verifies the identity of the registrant the server authorizes the creation of the account.

In some embodiments, the server is configured to receive registration and identification information from a mobile application.

In some embodiments, the identity proofing system is in communication with a third party database, wherein the identity proofing system is configured to communicate the first portion of the identification information to the third party database.

In some embodiments, the first portion of the identification information comprises identity information.

In some embodiments, the identity information comprises identity information available in the third party database.

In some embodiments, the identity information comprises driver license information.

In some embodiments, the second portion of the identification information comprises a visual indication.

In some embodiments, the visual indication further comprises a representation of computer readable code.

In some embodiments, the visual indication is accompanied by a location identifier.

In some embodiments, the visual indication is an image of a mail piece having a barcode thereon.

In some embodiments, the identification database comprises address information and location information.

In some embodiments, the system further comprises a biometric analysis module in communication with the server, wherein the biometric analysis module is configured to receive a third portion of the identification information from the server, and the server is further configured to receive verification information.

In some embodiments, the third portion of the identification information comprises a biometric identifier.

In some embodiments, the biometric identifier is a fingerprint.

In another aspect, a method of verifying an identity comprises receiving registration information from a registrant; receiving identification information from a registrant; communicating the identification information to an identification verification module; verifying the identification information; comparing the registration information with the verified identification information; and verifying the identity of the registrant based on the comparison of the registration information with the verified identification information.

In some embodiments, verifying the identification information comprises communicating identification information to an identification module.

In some embodiments, the identification information comprises a visual representation of a government issued identification.

In some embodiments, the identification module communicates with a government agency database.

In some embodiments, the identification information comprises a visual representation of an identifying item.

In some embodiments, the visual representation of the identifying item is associated with location information.

In some embodiments, the identification module communicates with a database of location identification information.

In some embodiments, the identity of the registrant comprises comparing location identification information with the location information associated with the visual representation of the identifying item.

In another aspect, a system for verifying identity comprises means for receiving registration information from a registrant; means for receiving identification information from a registrant; means for communicating the identification information to an identification verification module; means for verifying the identification information; means for comparing the registration information with the verified identification information; and means for verifying the identity of the registrant based on the comparison of the registration information with the verified identification information.

DETAILED DESCRIPTION

Figure 1:
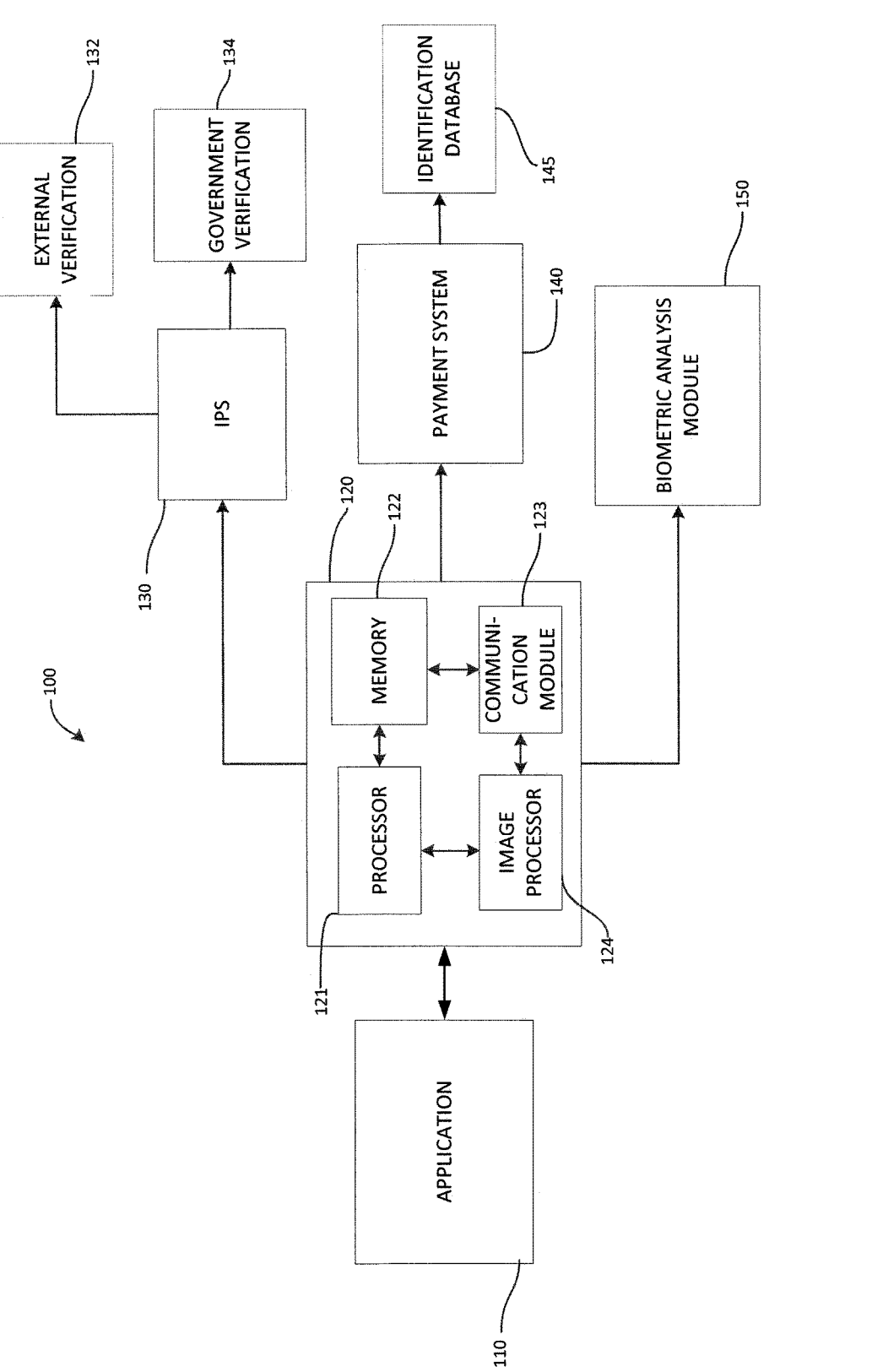
FIG. 1 is a block diagram depicting an embodiment of a system for identity verification.

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Certain embodiments described herein can be used to verify the identity of a user who registers or requests an account with an entity. A user or registrant, when requesting an account or registration online or via a mobile application, may provide registration information, such as a name, phone number, email, address, and the like. In order to verify the identity of the registrant, the provider of the account or registration requests additional identification information. The additional identification information, which may be provided electronically, may then be used for verification of the user or registrant's identity. The electronic verification described herein can be used in lieu of an in-person verification, which may be inconvenient and time-consuming.

Some embodiments described herein use or compare the registrant identification information with a variety of sources in order to verify the identity of a user or applicant. As a non-limiting example, the United States Postal Service (USPS) may require that a user register and be approved for an account for using the gopost system, which is a system of secure parcel lockers, as described in U.S. Provisional Application No. 61/738,085, filed Dec. 17, 2012, the entire contents of which are hereby incorporated by reference. Because the mails are protected by federal law, and because the USPS and individuals have a vested interest in the security of items and articles sent through the mails, the identity of a user registering for an account may desirably be verified to minimize fraud and the sending of contraband articles.

In order to increase the convenience of a user or registrant during account creation, a registration request, access request, authorization request, transaction request, or any other request authorization, the user or registrant may access the registration, account, authorization, or transaction request via a mobile application. The mobile application may be implemented on, for example, a personal electronic device, mobile smart phone, tablet computer, or the like. Where a user or registrant employs a smart phone, tablet computer or similar mobile communication device, the user or registrant may provide photographic, visual, and other types of identity information to the server 120 for verification. When using a location detection enabled mobile communication device (e.g., having GPS or network location features), a user or registrant may also submit location information as part of the registrant's information for use in verification.

FIG. 1 depicts a block diagram of a system for verifying identity. An identification system 100 comprises an application 110, a server 120, an identity proofing system (IPS) 130, an identification module 140, and a biometric analysis module 150.

The application 110 comprises an electronic interface, such as is available on a website via the internet or via a mobile application. The application 110 may be stored and/or accessed from a smart phone, personal digital assistant, tablet computer, laptop computer, or other mobile communication device. The application 110 is configured to interface with the server 120 via a wired or wireless communication method. Where the application 110 is available on a smart phone or other mobile communication device, the interface between the application 110 and the server 120 may advantageously be via a cellular network, a wireless fidelity network using an IEEE 802.11x protocol, a Bluetooth connection, or any other desired wireless communication method.

The application 110 is configured to allow a user or registrant to provide registration information to the server 120. The registration information may be a name, address, phone number, email, and the like, which the registrant inputs as part of the registration or request for an account or other similar request. The application 110 may submit the user provided registration information to the server 120.

The application 110 is additionally configured to request and receive identification information, such as identifying documents, from the user or registrant. In some embodiments, the identification information may comprise visual depictions, such as photographs; location data, such as GPS coordinates; metadata; and account information, such as account information relating to a cellular telephone account, a utility account, or account at a financial institution or other service provider. The application is configured to submit the identification information to the server 120 as part of a registration process for an account or other services where identity is desirably verified, where the identification information is stored and/or processed.

The server 120 comprises a processor 121, a memory 122 storing instructions for directing the operation of the processor, a communications module 123, and an image processor 124. The processor 121 directs the operation of the server, including the interface and communication of the server 120 with the various other components of system 100. The communications module 123 is configured to send and receive information from the various components of the system 100, and facilitates communication between the server 120 with the various components of the system 100. The communication module may communicate via wired and/or wireless methods and protocols as described herein. The image processor 124 may be configured to receive a visual representation, such as a photograph, as identification information and may be configured to analyze the visual information, including reading computer-readable codes, alphanumeric text, performing optical character recognition (OCR) of the visual information, and any other desired visual analysis. In some embodiments, the image processor 124 is further configured to receive, identify, and/or interpret location information, such as GPS coordinates, network location coordinates, or other location information. In some embodiments, the location information may be provided with the visual representation, such as, for example, attached to a photograph as metadata, or in a separate transmission with the visual representation.

In some embodiments, a registrant's or user's identity may be desirably verified using multiple pieces of identification information. The application 110 may request and receive more than one piece or portion of identification information, and transmit the more than one portion of identification information to the server 120. The server 120 is configured to identify and separate the pieces or portions of information, and is configured to route the pieces of information to the corresponding parts of the system 100. For example, where the registrant or user provides personal contact or third party account information and/or a visual identifier, the server 120 may communicate the personal contact or third party account information to the IPS 130 and the visual identifier to the identification module 140. This process will be described in greater detail below.

The IPS 130 is in communication with the server 120. In some embodiments, the IPS 130 is in further communication with an external verification system 132, and a government verification system 134. The external verification system 132 may be, for example, a database or the like maintained by a cellular carrier, a financial institution, a utility, a commercial entity such as a retailer or delivery service, an email provider, or other similar entities. The government verification system 134 may be a state driver license agency, a federal passport agency, a military agency, the postal service, the social security administration, or any other similar governmental entity.

The IPS 130 is configured to receive the registrant's identification information from the server 120, which the processor 121 and/or the image processor has modified from the form in which it was provided by the user or registrant via the application 110. In some embodiments, the registrant may provide information relating to an account the user has with a third party or a governmental entity via application 110, which the server 120 would then communicate to the IPS 130. The IPS 130 is configured to receive the identification information, identifying documents, and the like from the server and submit the information to the external verification system 132 or the government verification system 134, as appropriate.

In a non-limiting example, the identification information may comprise a cellular telephone number or account number provided automatically by the mobile communication device on which the application 110 is running, if the registrant is using a mobile communication device to access the application 110. The application 110 automatically submits the telephone number associated with the mobile communication device on which the application 110 is being used to the server. IPS 130 is configured to receive the cellular telephone number from the server 120, and query the external verification system 132, which retrieves the contact information maintained by the cellular carrier associated with the cellular telephone number. The IPS 130 is then configured to compare the received contact information with the registration information provided by the registrant. If the information matches, the IPS 130 is configured to verify the identification information and transmit a verification to the server 120.

The IPS 130 is similarly configured to query the government agency. A registrant may submit a photograph or visual representation of a government issued identification, which is received into the server 120. The image processor 124 is configured to process the visual representation and identify a security feature and/or a name, address, social security number, and other information contained on a government issued identification. The IPS 130 is configured to submit this information to the government verification system 134. The government verification system 134 may provide a verification of a security feature or other verification, which the IPS 130 may transmit to the server 120.

The identification module 140 is configured to receive a portion of a registrant's information from the server 120. For example, a registrant may provide identification information and/or location information into the application 110, which the server 120 provides to the identification module 140. The identification module 140 verifies the received information with the information stored in an identification database 145. In some embodiments, the identification information provided to the identification module 140 may be a visual representation of an identifying item, such as a mail piece, the façade of a home, a recently received item from a merchant, or any other desired identifying item. The identification module 140 may be configured to interface with the identification database 145. The identification database 145 may contain identity and location information. In some embodiments, the identification module 140 may be configured to receive a barcode and/or text information from the server 120, such as from a visual image processed by the image processor 124 as described elsewhere herein. The identification module 140 may be configured to query the identification database 145 using the received information from the server, and to associate identity information, such as addresses, with location information, such as GPS coordinates. The identification module 140 may then compare identity and location information from the identification database 145 with the location information and any information received from the visual representation of the identifying item. This process will be described in more detail below.

The biometric analysis module 150 may comprise a database of biometric information, and may be configured to perform biometric analysis on a portion of the information received from a registrant via the application 110. In some embodiments, the biometric analysis module 150 may perform facial recognition of a photograph of a user's face, fingerprint analysis and matching, or other biometric analysis. The biometric analysis module 150 may be configured to access external databases containing biometric information. The biometric analysis module 150 may be configured to analyze the biometric information from the user or registrant, and compare the biometric information to verify the identity of the user or registrant.

Figure 2:
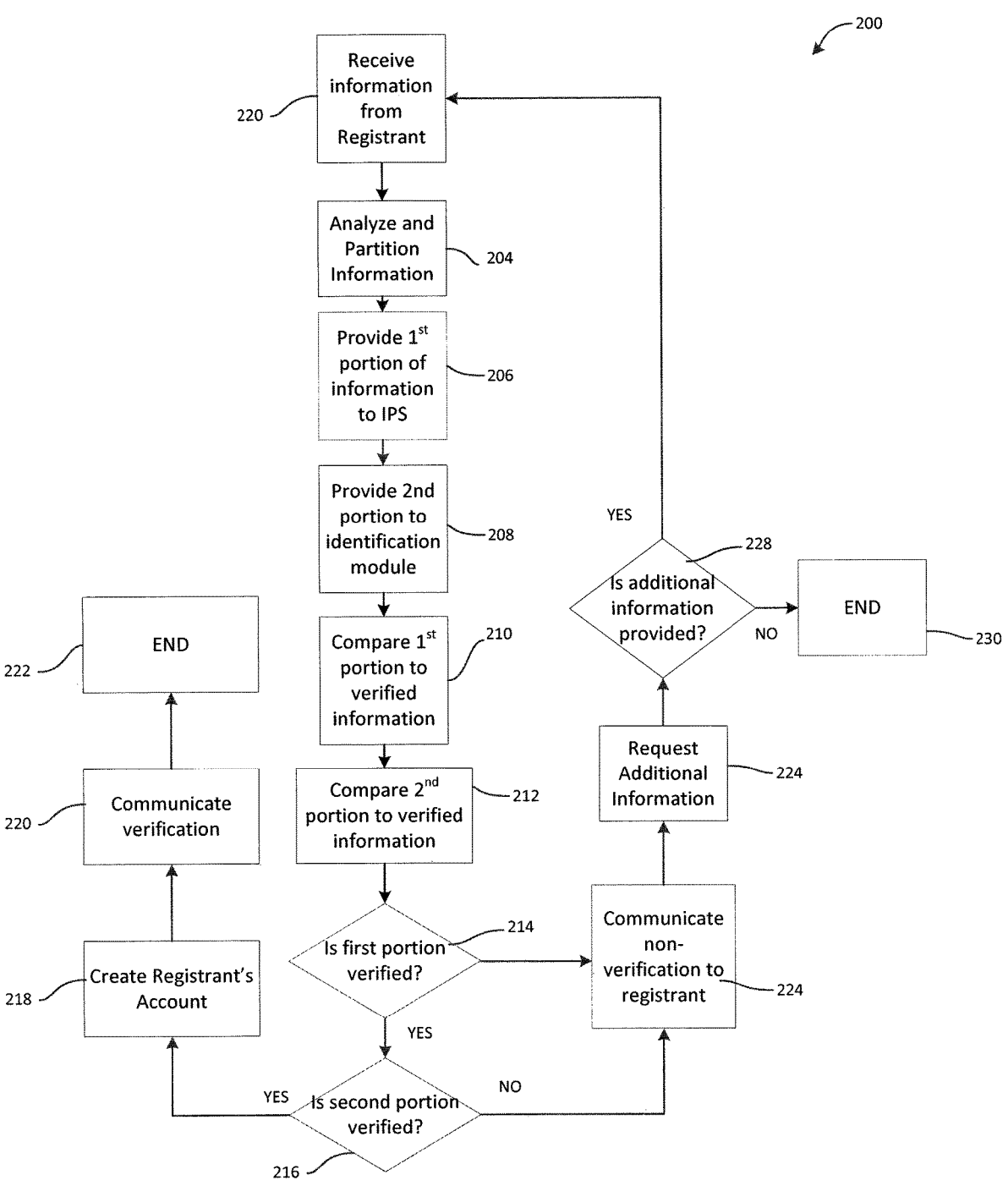
FIG. 2 is a flowchart describing a method for verifying a user's identity.

FIG. 2 is a flowchart depicting a process 200 for verifying identity of a user or registrant. The process 200 beings in block 202 wherein the user or registrant's information is received into the application 110. The user or registrant provides registration information as part of the registration process, and the application 110 also requests and receives identification information. The identification information provided by the user may comprise one or more portions. For example, in some verification situations, the application 110 may request or require two separate types of identification information in order to verify the identity of the user or registrant. In some embodiments, the identification information comprises a first portion and a second portion.

In some embodiments, the first portion of the information may comprise identity information such as the user's or registrant's unique mobile telephone number, account number, or other similar identity information. In some embodiments, the information is provided using a mobile application on the user or registrant's smart phone. When using the application 110 to register for an account, the application 110 may automatically provide the user's mobile telephone number, cellular account number, or other information associated with the smart phone. In some embodiments, the first portion may comprise a photograph of a user's government issued photo identification, such as a driver license, passport, military identification, or the like.

In some embodiments, the second portion of the identification information may comprise location information. In some embodiments, the registrant or user may provide a photograph or electronic image which contains location information. In some embodiments, a user or registrant submits a photograph of an identifying item, which may be taken on the user's smart phone, the photograph containing location information, for example, saved in metadata. For example, the user or registrant may enable GPS tracking on his/her smart phone prior to taking a photograph of the identifying item. The application 110 may submit the photograph of the identifying item together with the GPS coordinates of the smart phone at the time the photograph is taken. In some embodiments, the identifying item may be the government issued photo identification, described above. In some embodiments, the identifying item may be a mail piece which has been delivered to the user or registrant's address and which displays the user or registrant's name and address, and may have a barcode. In some embodiments, the identifying item may be the façade of a house, a unique household item, an item recently purchased from a retailer, and the like.

The process 200 moves to block 204 wherein the server 120 analyzes and partitions the first and second portions of the identification information and evaluates them. The image processor 124 may process an image, photograph, or electronic image provided as described above, including OCR of any written text. The server 120 partitions the information by determining which portion of the information is the first portion and which is the second portion, and prepares each for communication to the appropriate part of the system 100. In some embodiments, the application 110 may be configured to submit the first and second portions of the identification information in two distinct submissions, which are partitioned and communicated by the server 120. In some embodiments, the application 110 may submit all the identification information and the server 120 partitions the identification information based the particular information received. For example, if the server 120 receives and recognizes that some of the identification information is a photograph of a driver license, the server 120 partitions that portion of the information. If the server 120 receives a photograph of an identifying item, the server 120 recognizes the identifying item.

The process 200 proceeds to block 206 wherein the server 120 provides the first portion of the registrant's identification information to the IPS 130. The process 200 then moves to block 208 wherein the server 120 provides the second portion of the registrant's identification information to the identification module 140.

The process next moves to block 210, wherein the IPS 130 compares the first portion of the identification information to the registration information. In some embodiments, comparing the first portion of the identification information comprises receiving and evaluating the first portion of the identification information. For example, where the first portion of information is a unique mobile number, a cellular account, bank account information, or similar information, the IPS 130 provides that information to the external identification verification system 132, which may be, a third party institution such as, for example, a cellular provider, a financial institution, or the like. The external identification system 132 receives the first portion of the information and accesses a registrant or users stored information, and the external identification system provides the user's stored information to the IPS 130. The IPS compares the stored information held by third party institution and received from the external identification system 132 to the identification information provided by the registrant. For example, the user or registrant may have provided initial identification information when applying to create an account. The IPS 130 receives the compares the account information associated with the unique mobile number or account information, such as a name, address, email address, phone number, etc., with the initial identification information. In some embodiments, the application 110 may instruct the third party institution to contact the registrant via voice call, SMS message, email with a verification link, or the like, and provide the registrant the ability to confirm or deny the attempt at registration. By informing a potential registrant of an attempt to register for an account to confirm the registration, fraudulent registrations may be reduced, and the potential registrant is alerted to the attempt by another to register for an account using another's information.

In some embodiments, the first portion of the identification information is government issued identification. In this case, the IPS 130 provides the information to the government verification system 134 for the government organization which issued the identification, and requests verification of the information or validity of the government issued identification. This may comprise providing an indication of a security feature, a computer readable code, and the like, which appears on the government issued identification to the agency for verification that the government issued identification is not counterfeit or otherwise invalid.

The process 200 moves to block 212, wherein the identification module 140 compares the second portion of the information with the information stored in the identification database. For example, the user or registrant provides a visual representation or photograph of an identifying item upon registration, and associated location information. In some embodiments, the location information comprises GPS coordinates provided by the GPS unit in a smart phone used to take the picture or generate the visual representation of the identifying item. In some embodiments, the location information is the current GPS coordinates of the smart phone at the time the visual representation of the identifying item is generated. The identification module 140 receives the visual representation, or in some embodiments, information derived from the visual representation, of the identifying item and the corresponding location information. The identification module 140 then compares the visual representation, or the information derived from the visual representation together with the location information, with data in the identification database 145. For example, a user enables GPS on his/her smart phone and takes a photograph of a piece of mail which has been delivered to the user's address. The user takes the photograph of the mail piece while the user is at the address on the mail piece. The image processor 124 receives the photograph of the mail piece, and converts the information from the photograph to, for example, a name, address, and the like, for the user or registrant. The identification module 140 then compares the GPS location received from the user or registrant with the address obtained from the photograph of the mail piece. If the GPS location of the smart phone at the time the photograph of the mail piece was taken matches the address obtained from the photograph of the mail piece, the identification module 140 verifies the identity of the user, and provides verification to the server 120.

In some embodiments, the identifying item may be a photograph of a user's house or an item recently purchased from a vendor. The identification module 140 may compare the photograph with the image of a house corresponding to the address provided by the user. For example, the identification database 145 may comprise a collection of images of houses, such as that available on Google® maps. If the image contained in the identification database 145 matches the photograph of the house and indicates the photograph was taken at the correct location, the identification module 140 may verify the identity of the user, and provide the verification to the server 120.

Where the identifying item is a recently purchased item, the identification database 145 may comprise sales information from a vendor, such as a list of recent purchases. If the vendor confirms that a purchase matching the description, dates, or timing of the item in the photograph did occur, the identification module may verify the user's information and provide the verification to the server 120.

The process 200 moves to decision state 214, wherein it is determined whether the first portion of the identification information is verified by the IPS 130 as described above. If the IPS 130 has verified the first portion of the identification information, the process 200 moves to decision state wherein it is determined whether the identification module 140 has verified the second portion of the information. If both the first portion and the second portion of the information are verified, the process 200 moves to block 218, wherein the server 120 grants registration, authorization for the requested transaction, opens the account, or whatever other procedure the user or registrant requested. In some embodiments, the server 120 communicates with an external computer or computer system to verify the user or registrant identity and to communicate that the user or registrant's identity has been verified, and an account can be opened, authorization can be granted, a transaction may be conducted, or the like.

In some embodiments, process 200, may require that only the first or the second portions, and not necessarily both, be verified in order to identify the user or registrant. In some embodiments, for example, process 200 may not comprise blocks 206, 210 and 214. In some embodiments, process 200 may not comprise blocks 208, 212, and 216. A person of skill in the art will understand that process 200 is exemplary, and steps thereof may be omitted or performed in a different order without departing from the scope of the present development. In some embodiments, the system may require verification of a third portion of the identification information using a biometric analysis module 150 as described above.

The process 200 next moves to block 220, wherein the account creation is communicated to the application 110, whereupon the user or registrant may receive the confirmation of the account creation, and may receive any data associated with that, such as the account number, a username, a password, and the like. Upon creation of the account, the application may receive a computer readable code, such as a barcode or QR code which uniquely identifies the registrant and encodes or is linked to the registrant's credentials. The computer readable code can be received by the application and graphically displayed on the registrant's mobile communication device, in the form of a virtual identification card. The computer readable code may be stored on the mobile communication device, to be accessed by the registrant at a later time. The process ends in block 222.

If the first or second portion of the identification information is not verified in block 214 or 216, the process moves to block 224, wherein the server 120 communicates to the application 110 that the information could not be verified, and that an account is not opened or that a registration has not been created. The process 200 next moves to block 226 wherein the server 120 requests that additional information be provided, or that the user or registrant resubmit the information.

The process 200 moves to decision state 228, wherein it is determined if a user or registrant has provided additional information. If additional information is not provided, the process 200 ends in block 230. If the user provides additional information, the process returns to block 202, wherein the user or identification information is received into the server 120, and the process continues as described above.

In some embodiments, the application 110 can be provided by and/or used to access a distribution network, such as the United States Postal Service (USPS). The application 110 can specifically be used to access a system of secure parcel lockers as described in greater detail in the above-referenced application. The mobile application may provide functionality to allow a user to access and/or request information about the system of secure parcel lockers and articles purchased by, or intended for delivery to, the user. For example, after identity is verified, the registrant accesses the mobile application which can provide push notifications when an article is intended for delivery to the registrant. The push notification can be an email, an SMS notification, or any other desired notification. In some embodiments, the mobile application can send similar notifications to the shipper, sender, or originator of the item when the item has been shipped or when the registrant retrieves the item from a secure parcel locker.

The application 110 can display the location of secure parcel lockers within a registrant's geographic location by using GPS/A-GPS or Wi-Fi assisted location methods from the mobile computing device on which the mobile application is running. A registrant may be able to store favorite secure parcel locker locations in the application. In some embodiments, the mobile application can alert the registrant when the registrant is within a certain distance of a secure parcel locker or a retailer who has a partnership with the secure parcel locker service. In some embodiments, when a registrant is within a particular distance of a partner retailer, the mobile application can alert the registrant and identify the partner retailer. The mobile application can then provide the option to purchase an article from the partner retailer, and identify the secure parcel locker to which the article should be delivered.

In some embodiments, a registrant may use the application to track articles that are intended for delivery to the recipient at a secure parcel locker. As part of the tracking functionality, the registrant can change or alter the destination of an article which is intended for delivery to the registrant. For example, after a registrant is informed of an article intended for delivery to the registrant, the registrant may access the mobile application and specify an alternate destination for the article. If an article is to be delivered to a first secure parcel locker, and the registrant is located geographically nearer a second secure parcel locker, the registrant may choose to have the article delivered to the second secure parcel locker. In some embodiments, the registrant may specify a pick-up time, or extend the allowable pick-up window at the secure parcel locker. In some embodiments, if an item has already been delivered to a secure parcel locker for the registrant, but the registrant is unable to pick up the item from that secure parcel locker, the registrant may, via the application, request that the article be forwarded to a different secure parcel locker.

In some embodiments, the registrant may use the stored computer readable code, or the virtual identification card, at a secure parcel locker. The secure parcel locker may have a scanner, and the registrant can scan the computer readable code displayed on the registrant's mobile communication device on the secure parcel locker's scanner. The secure parcel locker receives the scanned computer readable code, and if the secure parcel locker recognizes the computer readable code and the registrant's identity is confirmed, the registrant is allowed to access the secured parcel locker system and retrieve the article intended for the registrant.

Figure 3:
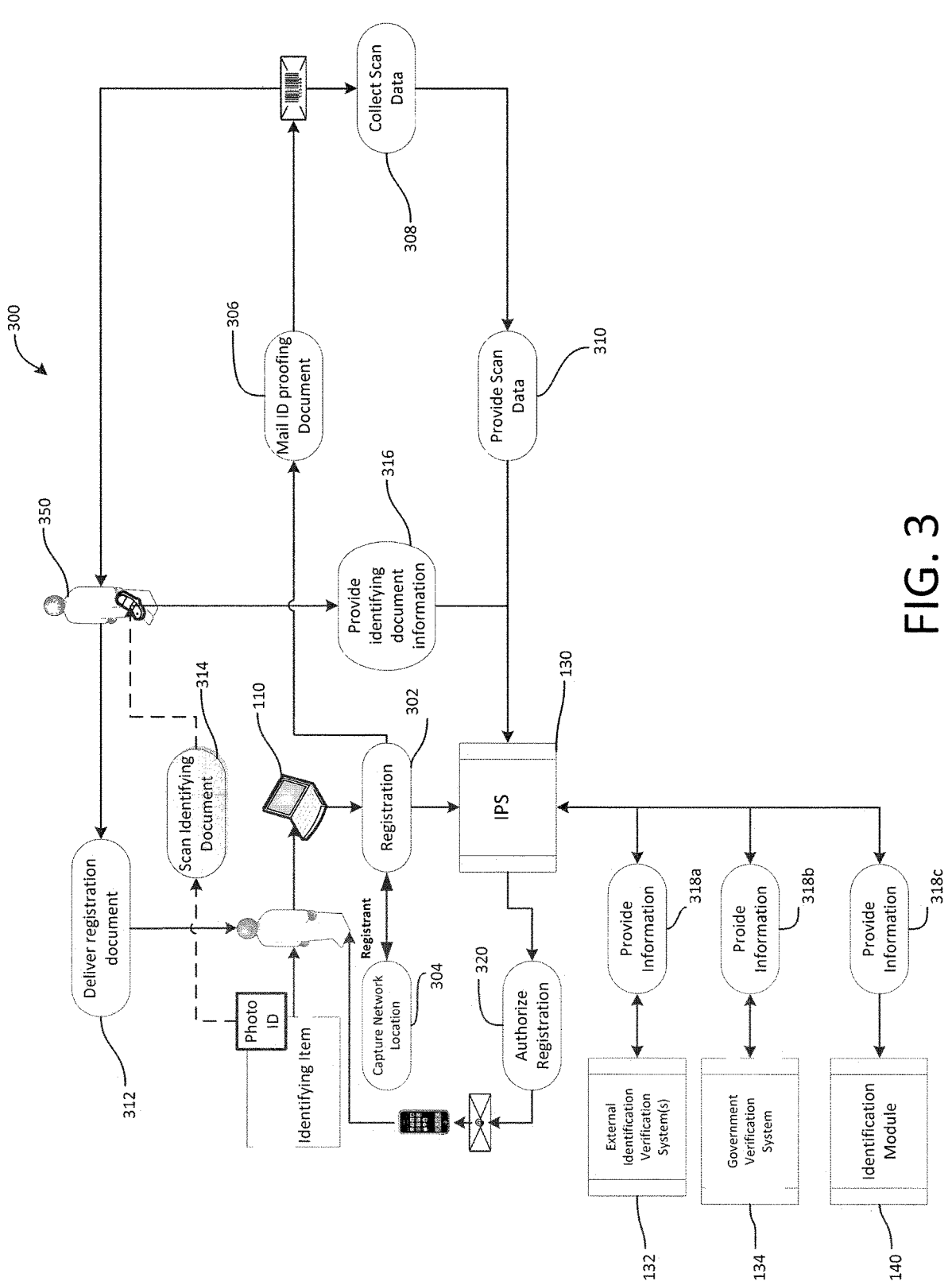
FIG. 3 is a diagram depicting a process for verifying identity.

FIG. 3 provides a diagram depicting an identity verification process implemented by the USPS. Process 300 starts in block 302 where a registrant provides information to the application 110 for identity verification as described elsewhere herein. At the time registrant provides information, the application 110 also captures network information in block 304. The network information captured can be indicative of a network address or network location used by the application 110 for registration. For example, if the registrant registers on a mobile communication device, the application 110 captures the network address and location from the cellular network or wireless network being accesses by the mobile communication device. This information is transmitted to the server 120 and/or the IPS 130.

As part of the registration process, the application 110 receives an electronic version of an identity proofing form from the server 120, and delivers the electronic document to the application 110. The identity proofing form comprises computer readable code which uniquely identifies the document, such as a barcode. The application 110 may also deliver a self-addressed registration document. The self-addressed registration document is a document that the registrant can send to the USPS, having the registrant's address thereon, which the USPS can then send back to the registrant. A registrant may be required to print the identity proofing form and the self-addressed registration document and provide the identity proofing form and the self-addressed registration document via physical mail to a designated USPS location. The registrant may also be required to mail other indicia of identity, such as a copy of a government issued photo identification, such as a driver license, passport, etc. In block 306, the registrant mails a physical copy of the identity proofing form to the USPS along with any required copy of the government issued photo identification. In some embodiments, the government issued photo identification need not be mailed, but an image thereof is provided to the application 110 as described elsewhere herein.

In block 308, the physical copy of the identity proofing form is received by the USPS and the computer readable code is scanned. Scan data generated by the mail processing equipment through which the identity proofing form passed en route to the USPS location for the identity proofing form is collected and processed. The collected scan data indicates the approximate geographic origin of the identity proofing form, which can be compared to the address provided by the registrant while applying for an account. The scan data is then provided to the IPS 130 in block 310.

In block 312, the registration document provided by the registrant and received at the USPS is delivered back to the registrant by a postal carrier 350. The postal carrier 350, physically present in person at the home of the registrant, may show the self-addressed registration document and request to see the identifying documents or identifying item provided or referenced during registration, such as the government issued photo identification or a utility bill showing the registrant's name and address (matching the address provided at registration).

In block 314, the postal carrier 350 scans, photographs, or otherwise obtains a copy of the documents (i.e., government issued photo id, utility bill, etc.). The postal carrier 350 may obtain a copy by taking an image of the identifying documents, such as a photo of the registrant's driver license using a handheld camera, a camera-enabled smartphone, or any other mobile communication device.

In block 316, the postal carrier 350 transmits the copy of the identifying documents to the IPS 130. In blocks 318*a* and 318*b*, as described elsewhere herein, the IPS 130 transmits information to the external verification system 132 and the government verification system 134, and the information is processed.

In block 318*c*, the scan data for the identity proofing form, including registrant's name and address is provided to the identification module 140, where it is compared to historical mail information stored in the identification database 145. For example, if the identity proofing form originated at a location in or near the address provided by the registrant, this is evidence that the registration information is correct, and not fraudulent.

In step 320, the IPS 130 authorizes registration based on all the received information, as described elsewhere herein. The authorization may be creation of credentials, such as a user name and password, which are then mailed to the registrant. In some embodiments, the authorization is an activation token transmitted to the mobile communication device on which the registrant wishes to use the application 110, the token allowing the registrant to access the features of the application 110. As described with regard to FIG. 2, if the identity is not verified based on the received information, the non-verification is communicated to the registrant, similar to block 224. Following either verification or non-verification, the process ends.

It will be understood that the blocks of process 300 are not necessarily performed in sequence, but more than one block can be performed concurrently or overlapping in time. One of skill in the art will also understand that not all steps need be performed in order to verify identity. The amount of information required to verify a registrant's identity may vary based on the application, and/or according to a level of assurance demanded by the provider of the application 110.

A person skilled in the art will recognize that each of these sub-systems can be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented by a processor which can comprise software, firmware or hardware and include any type of programmed step undertaken by components of the system.

A processor may be any conventional general purpose single- or multi-chip processor and/or microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for providing access to a secure locker, the system comprising:

a user interface configured to receive registration information and an image of an identifying document, the user interface comprising an application installed on a mobile computing device associated with a registrant, the application configured to:

receive, from the registrant, a registration request associated with the registration information and the image of the identifying document;

in response to receiving the registration request, automatically access a memory of the mobile computing device storing a telephone number that uniquely identifies the mobile computing device; and cause the mobile computing device to transmit, to a distribution network, the telephone number, geographic location data corresponding to the mobile computing device, the registration information, and the image of the identifying document;

a server in communication with the user interface, the server configured to:

receive the registration request;

process the image of the identifying document to detect a portion of the image containing a security feature of the identifying document;

send the portion of the image containing the security feature to a government verification system;

receive, from the government verification system, a verification that the security feature matches stored historical information;

verify the registration information by comparing the registration information to the portion of the image containing the security feature;

verify the telephone number by querying an external verification system;

verify the registrant based on the received verification from the government verification system, on the verified telephone number, and on the verified registration information;

in response to verifying the registrant, send a computer readable code to the user interface;

receive, from the user interface, a photograph of the registrant's face; and perform facial recognition, based on the photograph and on biometric information stored in a database, for confirmation of the registrant's identity; and a plurality of secure lockers located in a plurality of geographic locations and accessible by the distribution network, a first secure locker of the plurality of secure lockers having stored therein a mail piece which has been delivered, by the distribution network, to the secure locker for delivery to the registrant, the first secure locker being selected by the distribution network for delivery of the mail piece to the registrant based on being located in a geographic region corresponding to the geographic location data received from the application, the first secure locker comprising:

a scanner configured to scan the computer readable code from a display of the mobile computing device; and an access module in communication with the scanner, the access module configured to:

receive the computer readable code from the scanner;

verify the computer readable code with the server;

confirm the registrant's identity based on the facial recognition; and unlock the first secure locker, in response to verifying the computer readable code with the server and confirming the registrant's identity based on the facial recognition, to allow the registrant to retrieve the mail piece from the first secure locker.

2. The system of claim 1, wherein the registration information comprises address information and location information indicative of registrant location at a time of registration.

3. The system of claim 1, wherein the access module is in wireless communication with the user interface.

4. The system of claim 3, wherein the wireless communication is via a low power radio frequency connection.

5. The system of claim 1, wherein the computer readable code is a digital token.

6. The system of claim 5, wherein the digital token is received wirelessly by the scanner from a user device in proximity to the first secure locker.

7. The system of claim 1, further comprising a compartment within the first secure locker, wherein the compartment contains a parcel intended for a specific user.

8. The system of claim 7, wherein the access module is further configured to open the compartment containing the parcel in response to receiving the computer readable code.

9. The system of claim 1, further comprising a mobile computing device, wherein the mobile computing device displays the user interface.

10. The system of claim 9, wherein the scanner is configured to scan the computer readable code by scanning the user interface on the mobile computing device.

11. The system of claim 1, wherein the user interface receives the registration information and the image of the identifying document from the registrant.

12. A method for providing access to a secure locker, the method comprising:

receiving, in a user interface, registration information and an image of an identifying document, the user interface comprising an application installed on a mobile computing device associated with a registrant;

receiving, by the application from the registrant, a registration request associated with the registration information and the image of the identifying document;

automatically accessing, by application in response to receiving the registration request, a memory of the mobile computing device storing a telephone number that uniquely identifies the mobile computing device;

causing the mobile computing device to transmit, to a server, the telephone number, geographic location data corresponding to the mobile computing device, the registration information, and the image of the identifying document;

processing, by the server, the image of the identifying document to detect a portion of the image containing a security feature in the identifying document;

sending, by the server, the portion of the image containing the security feature to a government verification system;

receiving, from the government verification system, a verification that the security feature matches stored historical information;

verifying, by the server, the registration information by comparing the registration information to the portion of the image containing the security feature;

verifying, by the server, the telephone number by querying an external verification system;

verifying, by the server, the registrant based on the received verification from the government verification system, on the verified telephone number, and on the verified registration information;

generating, by the server, a computer readable code in response to verifying the registrant;

sending the computer readable code to the user interface;

receiving, from the user interface, a photograph of the registrant's face;

performing facial recognition, based on the photograph and on biometric information stored in a database, for confirmation of the registrant's identity;

receiving, from the application at a distribution network, the geographic location data;

selecting, by the distribution network, a first secure locker of a plurality of secure lockers located in a plurality of geographic locations, wherein the first secure locker is selected based on being located in a geographic region corresponding to the geographic location data received from the application;

delivering a mail piece, by the distribution network, to the first secure locker;

scanning, by a scanner on the secure locker, the computer readable code from a display of the mobile computing device;

transmitting, to the server, the computer readable code from an access module in communication with the scanner;

verifying, by the server, the computer readable code;

confirming the registrant's identity based on the facial recognition; and unlocking the first secure locker, in response to verifying the computer readable code by the server and confirming the registrant's identity based on the facial recognition, to allow the registrant to retrieve the mail piece from the first secure locker.

13. The method of claim 12, wherein receiving the registration information and the image of the identifying document comprises receiving the registration information and the image of the identifying document from the registrant.

14. The method of claim 12, wherein the user interface is usable on a mobile computing device.

15. The method of claim 14, wherein the computer readable code is a digital token stored on the mobile computing device.

16. The method of claim 15, wherein scanning the digital token comprises receiving the digital token via a low power radio frequency connection between the mobile computing device and the scanner.

17. The method of claim 16, wherein receiving the digital token comprises automatically receiving the digital token when the registrant is in proximity to the scanner.

18. The method of claim 14, wherein scanning the computer readable code comprises scanning a displayed graphic on the mobile computing device.

19. The method of claim 12, further comprising receiving, in a compartment of the first secure locker, a parcel.

20. The method of claim 19, further comprising opening the compartment containing the parcel in response to verifying the computer readable code.

* * * * *